Figure 1:
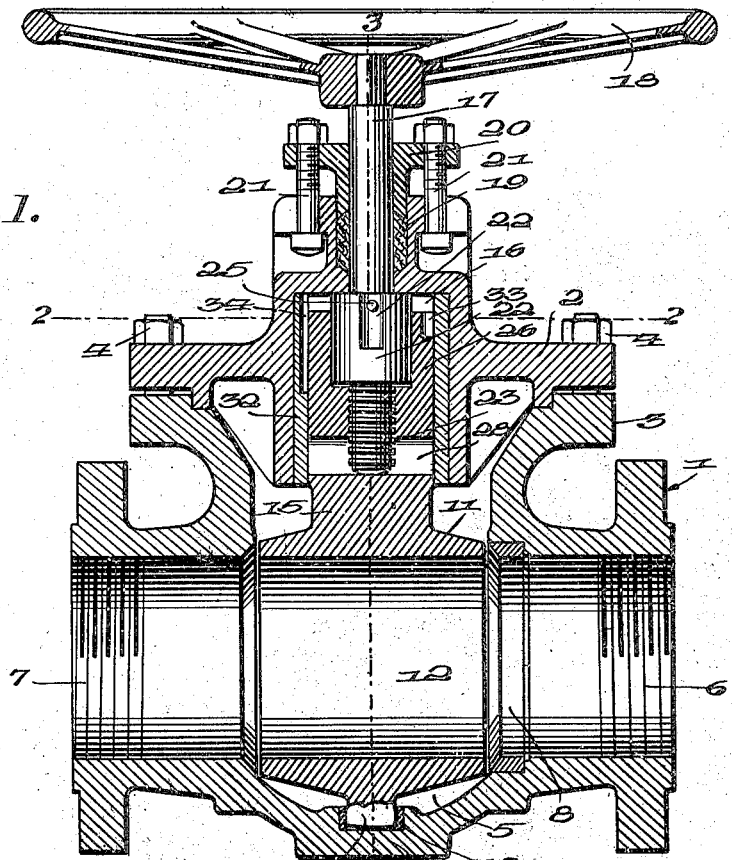

April 13, 1937. A. G. HEGGEM 2,076,838

VALVE

Filed March 2, 1935 7 Sheets-Sheet 1

Inventor:-
Alfred G. Heggem,
By Smith, Michael & Gardiner,
Attorneys.

April 13, 1937. A. G. HEGGEM 2,076,838
VALVE
Filed March 2, 1935 7 Sheets-Sheet 2
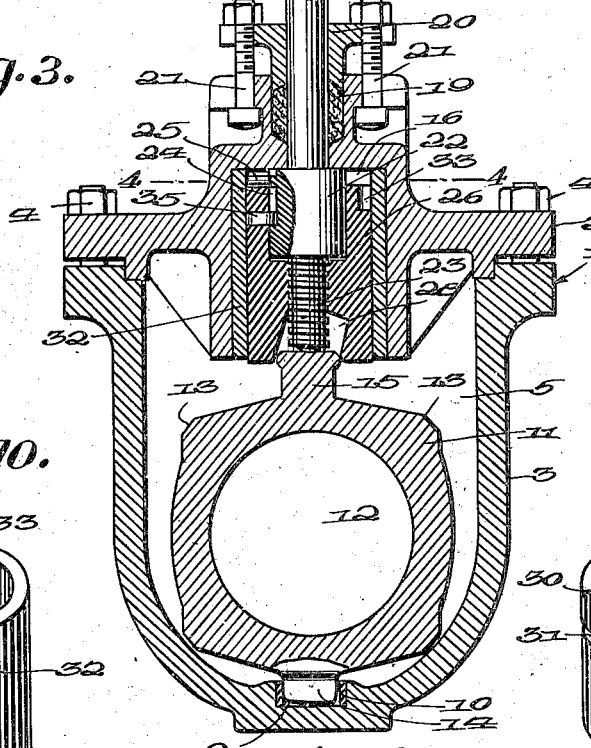
Fig. 3.
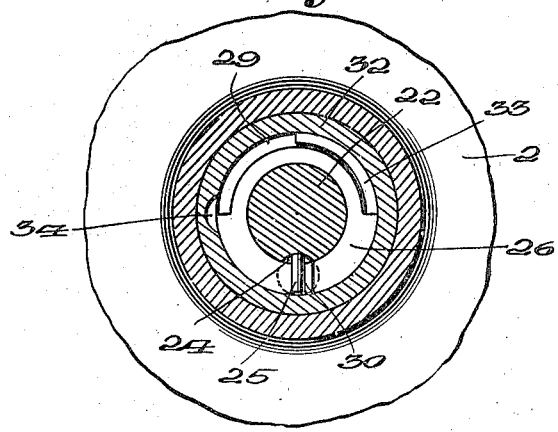
Fig. 4.
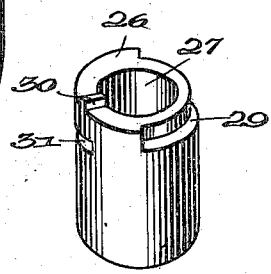
Fig. 11.
Fig. 10.
Inventor:
Alfred G. Heggem,
By Smith, Michael and Gardiner
Attorneys.

April 13, 1937.  A. G. HEGGEM  2,076,838
VALVE
Filed March 2, 1935  7 Sheets-Sheet 3
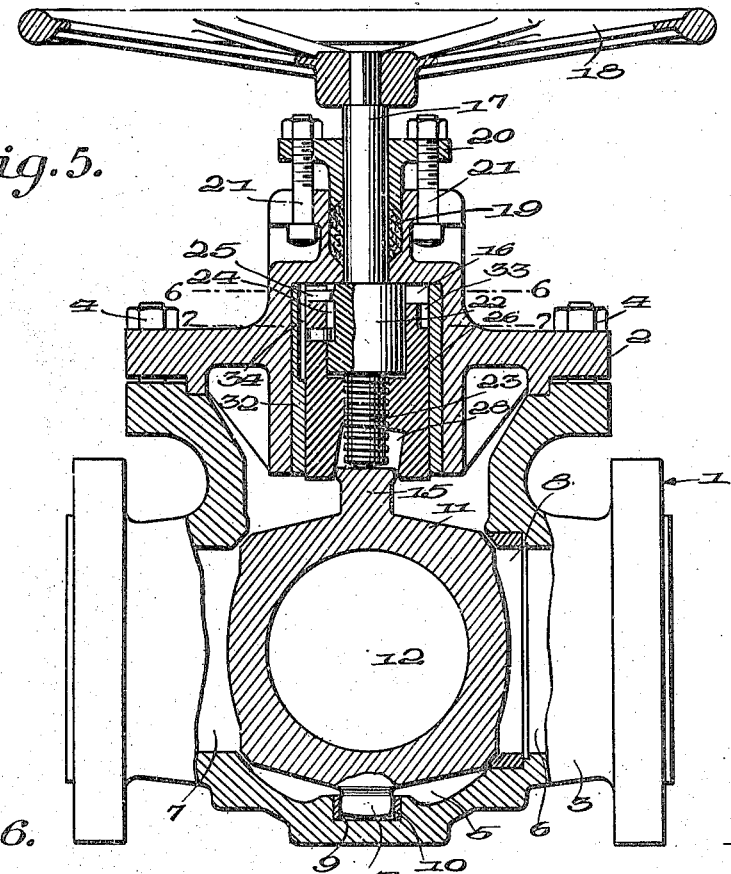
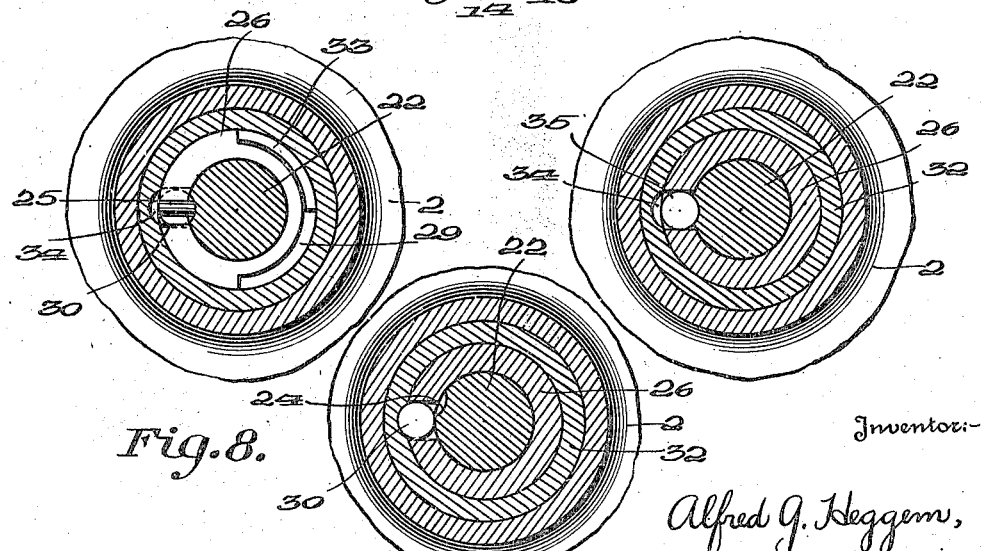
Inventor:-
Alfred G. Heggem,
By Smith, Michael & Gardiner,
Attorneys.

April 13, 1937.  A. G. HEGGEM  2,076,838
VALVE
Filed March 2, 1935  7 Sheets-Sheet 4

Inventor:-
Alfred. G. Heggem,
By Smith, Michael and Gardiner,
Attorneys.

April 13, 1937. A. G. HEGGEM 2,076,838
VALVE
Filed March 2, 1935 7 Sheets-Sheet 5

Inventor
Alfred G. Heggem,
By Smith, Michael & Gardiner,
Attorneys.

April 13, 1937. A. G. HEGGEM 2,076,838
VALVE
Filed March 2, 1935 7 Sheets-Sheet 6
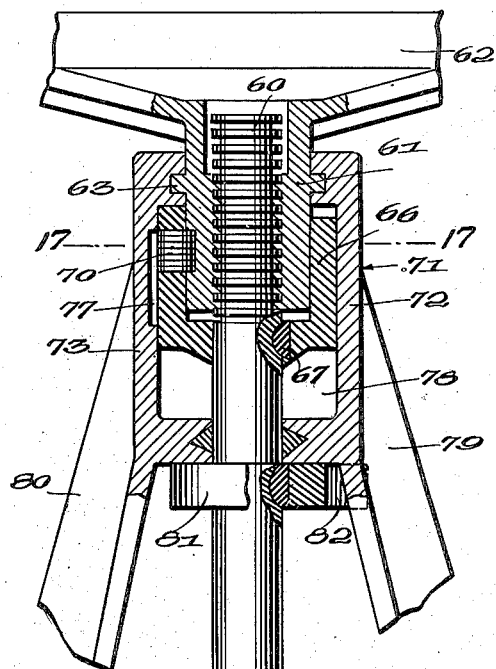
Fig. 14.
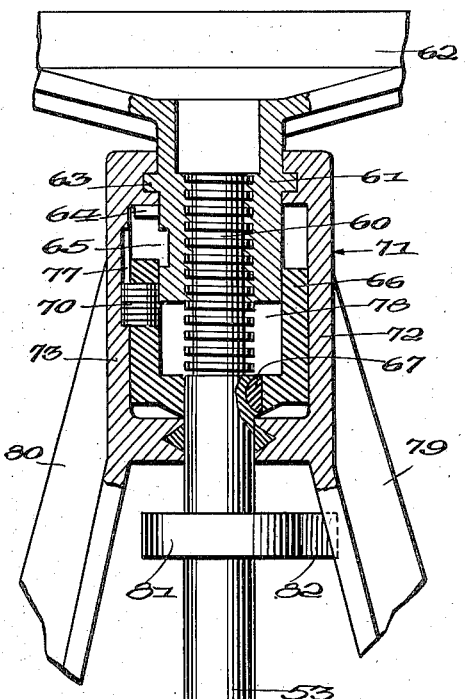
Fig. 15.
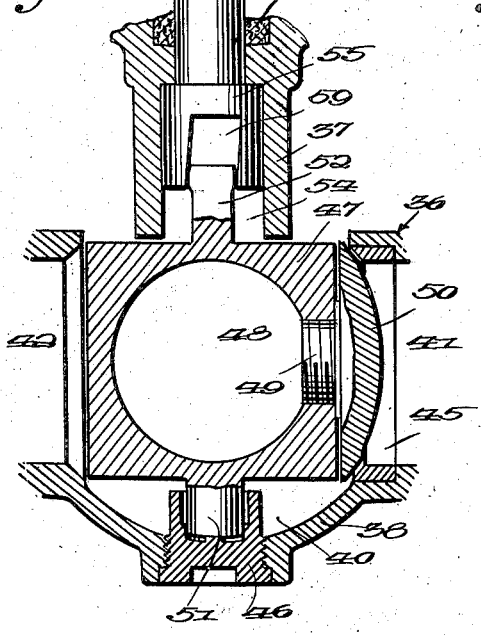
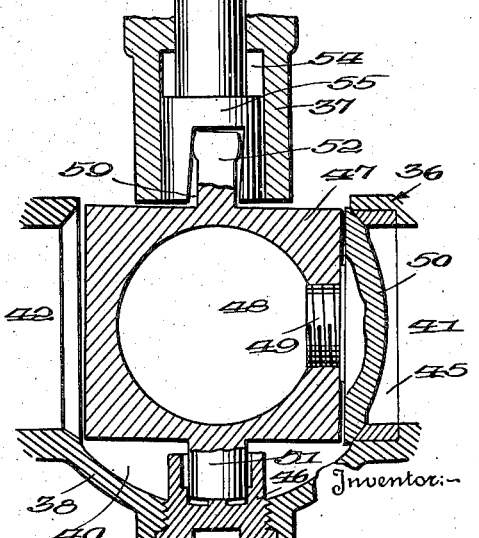
Inventor:
Alfred G. Heggem,
By Smith, Michael and Gardiner,
Attorneys.

April 13, 1937.  A. G. HEGGEM  2,076,838
VALVE
Filed March 2, 1935  7 Sheets-Sheet 7

Inventor
Alfred G. Heggem,
By Smith, Michael and Gardiner,
Attorneys

Patented Apr. 13, 1937

2,076,838

UNITED STATES PATENT OFFICE 2,076,838

VALVE

Alfred G. Heggem, Tulsa, Okla., assignor of one-third to Ed D. Ligon and one-third to William O. Ligon, both of Tulsa, Okla.

Application March 2, 1935, Serial No. 9,115

10 Claims. (Cl. 251—91)

My invention relates to valves of the same general type as that shown in my prior Patent 1,989,009 of January 22, 1935, and has particular reference to an improved valve of relatively large size especially suitable for use in the control of fluids operating under relatively high pressures, such as the pressures frequently encountered in oil and gas wells, pipe lines and similar high pressure installations.

In my aforesaid patent, I have disclosed and claimed a novel valve construction including a valve body having inlet and outlet openings and a valve chamber communicating with said openings; a valve core disposed within the chamber and rotatable with respect thereto; a valve stem rotatable with respect to the valve core and valve body; and means controlled by the rotation of the valve stem for alternately rotating and tilting the valve core. The combined rotating and tilting action of the valve core constitutes an important development in the art of high pressure valve constructions, and affords a highly efficient and reliable means for controlling the flow of fluids, due to the ready rotation of the valve core and the positive sealing or seating action effected by the tilting movement of the valve core into contact with its cooperating valve seat.

It is an object of my present invention to provide a valve construction of the above mentioned character and including a combined rotating and tilting valve core, and to associate with the said valve core a novel operating means actuated by the rotation of the valve handle and stem, for sequentially effecting the alternate rotating and tilting of the valve core with respect to its cooperating valve seat.

It is a further object of my invention to provide a novel operating means interposed between the valve handle and valve core to effectively transmit rotary motion of the handle to the valve core to cause an initial tilting of the valve core away from its cooperating valve seat and a subsequent rotation of the valve to aline the opening through the valve core with the inlet and/or outlet openings in the valve body as the valve core is moved to open position, and, when the valve handle is rotated in the opposite direction to close the valve, to cause an initial rotation of the valve core to move the opening therein out of alinement with the inlet and/or outlet openings in the valve body and a subsequent tilting of the valve core to move the flow-restricting portion thereof into firm and positive engagement with the cooperating valve seat.

It is a further object of my invention to provide a novel operating mechanism of the type referred to in the preceding paragraph for alternately rotating and tilting the valve core about its mounting in the valve chamber, and including a rotatable and axially movable member engaging the valve core, said member having inclined surfaces which engage the said core, the construction being such that rotary movement of said member will effect rotary movement of said valve core, and axial movement of said member will effect tilting movement of said valve core to cause said core to move toward or away from its cooperating valve seat due to the engagement between the inclined surfaces of the member and the valve core, clutching and declutching mechanism also being provided between the said member and the valve stem and between said member and the stationary valve casing to effect alternate rotary and axial movements of said member by rotation of the valve handle as said handle is rotated in opposite directions to move the valve core to open or closed position.

It is a still further object of my invention to provide a valve which is simple in construction and operation, easy to assemble and disassemble, strong and durable, capable of withstanding relatively high fluid pressures, and highly efficient in the purposes for which designed.

Figure 2:
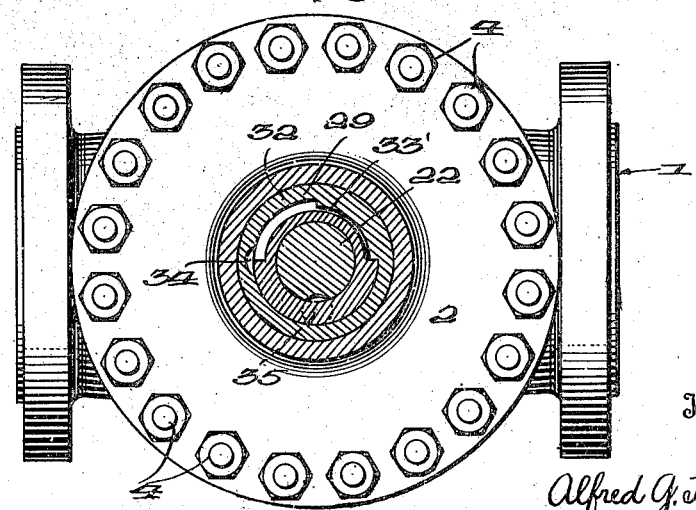
Figure 9:
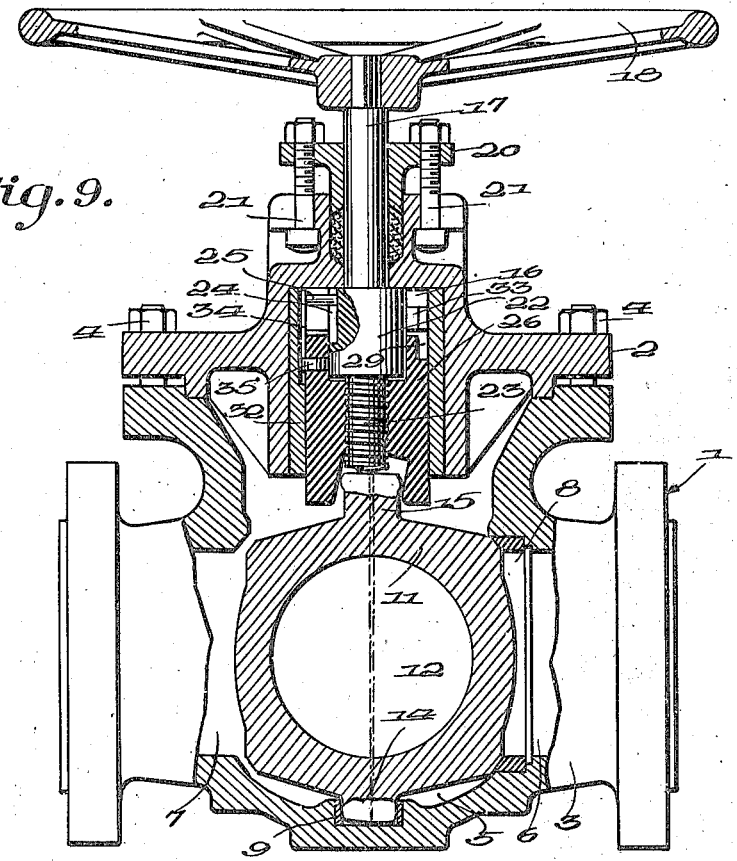
Figure 12:
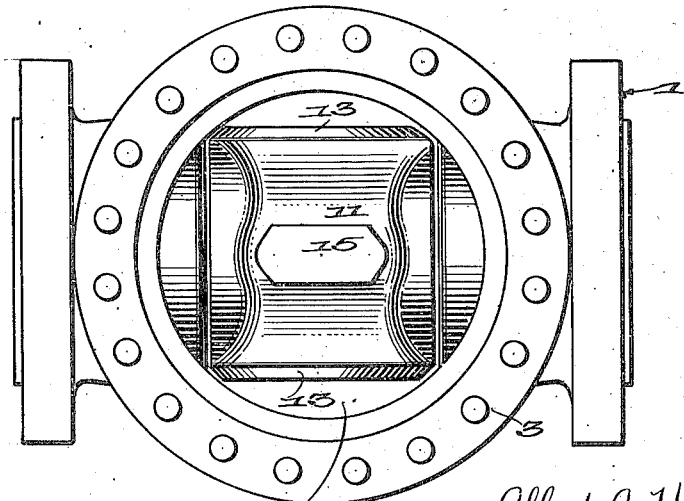
Figure 13:
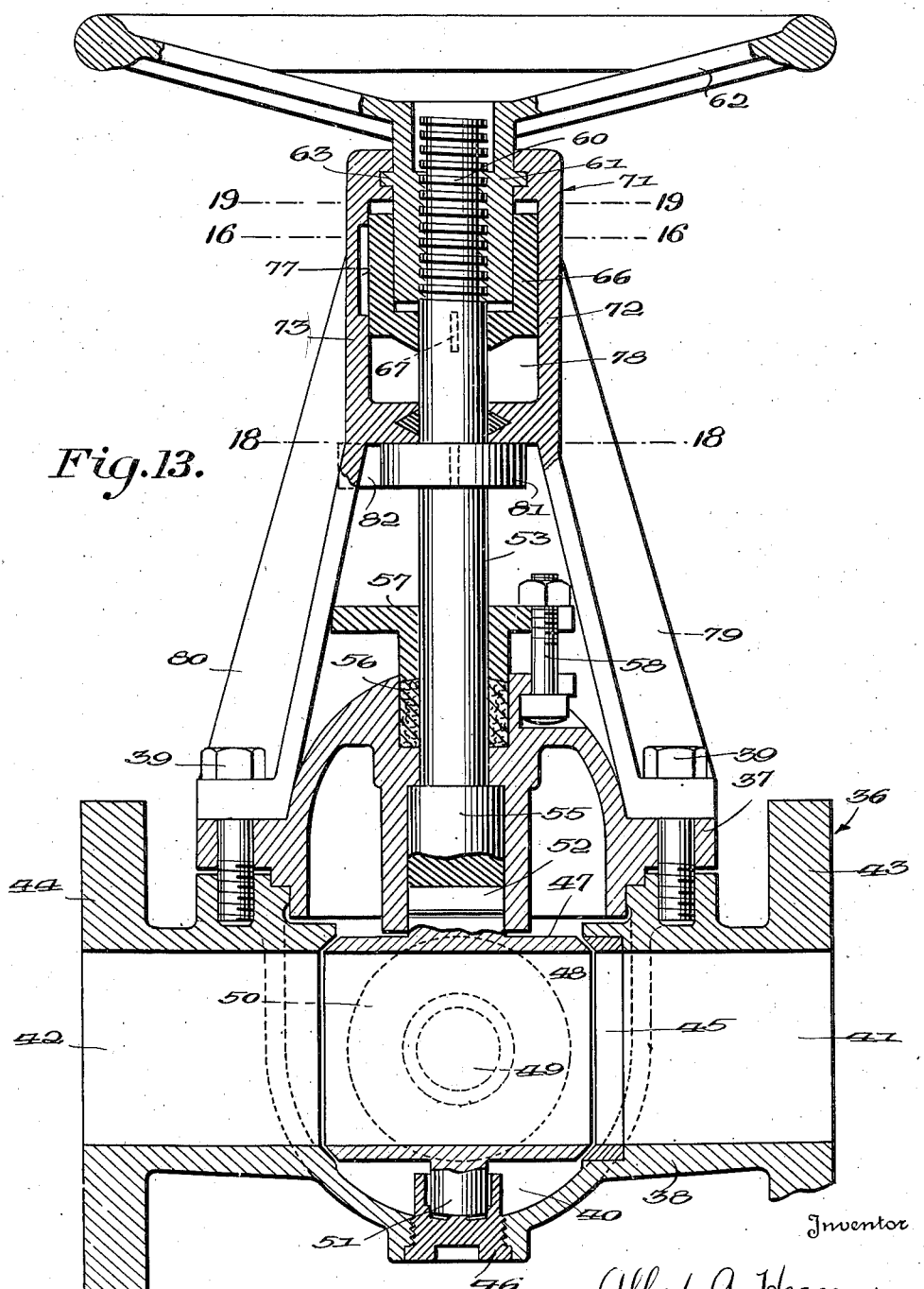
Figure 20:
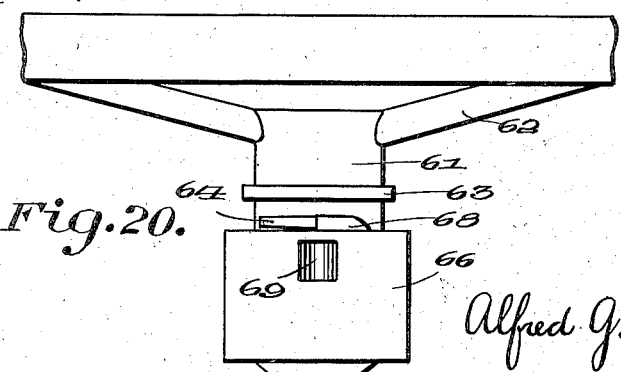

In the accompanying drawings forming a part of this specification and wherein, for the purpose of illustration, I have shown several preferred embodiments of my invention, Figure 1 is a central vertical sectional view of a valve embodying the features of my present invention and showing the valve in open position, Figures 2 and 3 are sectional views on the lines 2—2 and 3—3 of Figure 1, Figure 4 is a sectional view on the line 4—4 of Figure 3, Figure 5 is a central vertical sectional view of the valve illustrated in the preceding figures and showing the valve core after it has been rotated toward closed position but before the core has been tilted to force the core into contact with the cooperating valve seat, Figures 6 and 7 are, respectively, sectional views on the lines 6—6 and 7—7 of Figure 5, Figure 8 is a sectional view similar to Figure 7 but showing the relation of parts when the valve core has been rotated from open toward closed position and is ready to be tilted to force the core into contact with the cooperating valve seat, Figure 9 is a central vertical sectional view of the valve, showing the relation of parts when the valve core has been rotated and tilted to closed position, Figures 10 and 11 are perspective views of certain details of the valve operating mechanism, Figure 12 is a plan view of the valve with the upper casing section removed, Figure 13 is a central vertical sectional view of a modified form of valve embodying the features of my present invention, and showing the valve in open position, Figures 14 and 15 are fragmentary vertical sectional views of the form of my invention illustrated in Figure 13 and showing, respectively, the valve core in partial and in fully closed positions, Figures 16, 17, 18 and 19 are, respectively, sectional views on the line 16—16 of Figure 13, the line 17—17 of Figure 14 and on the lines 18—18 and 19—19 of Figure 13, and, Figure 20 is a fragmentary side elevation of a portion of the operating mechanism of the form of my invention shown in Figure 13.

In the accompanying drawings wherein like reference characters have been employed to designate like parts throughout the several views, the numeral 1 designates, broadly, the valve body, comprising an upper section 2 and a lower section 3, which sections are detachably secured together by a series of studs, bolts or nuts 4. The lower section 3 of the valve body is provided with a circularly curved chamber 5, communicating with which are passages 6 and 7 for the outflow and inflow of the fluid to be controlled by the valve. These passages 6 and 7 are disposed in axial alinement and are preferably interiorly threaded to permit the valve to be screwed on to a well casing, pipe or the like, this construction, because of the axial alinement of the inlet and outlet passages and the construction of the preferred valve core to be hereinafter disclosed, being admirably suited for use as a well casing valve, where it is frequently desired to operate the bits or other drilling or pumping tools directly through the valve and without the necessity of removing the valve from the casing. The outlet passage 6 is preferably provided with a machined valve seat 8 positioned at the inner end of the said passage. The wall defining the bottom of the chamber 5 is provided with a centrally located, circular recess 9, in which is positioned a thimble or bushing 10.

The chamber 5 within the lower section 3, is open at the top to permit the introduction of a valve core 11, which core is formed with a passage 12 cylindrical throughout its length and of a diameter corresponding to that of the passages 6 and 7 of the valve body so as to afford a straight, uninterrupted passage for fluid when the valve is in open position. The flat, imperforate side portions of the valve core 11 are machined to form tapered valve faces 13, said valve faces being of sufficient extent to border the margins of the passage 6 and being machined to cooperate with the valve seat 8 to effect a fluid tight seal or closure when one of said faces is moved into contact with said seat. The lower surface of the valve core 11 is provided with a centrally-located, circular trunnion 14, the outer face of which is curved, this trunnion fitting within the sleeve or bushing 10 with which it cooperates to permit rotary as well as tilting movement of the valve core 11 within the valve chamber. The upper surface of the valve core 11 is provided with an elongated, flattened extension 15 substantially T-shaped in vertical cross section, this flattened extension being disposed in parallel relation to the axis of the passage 12 through the valve core. It is to be noted particularly that the overall length of the valve core 11, in a direction parallel to the axis of the passage 12 therethrough, is less than the diameter of the chamber 5 and slightly less than the distance between the opposed ends of the outlet passage 6 and the inlet passage 7, this feature being adequately illustrated in Figure 12 of the accompanying drawings. Hence, the valve core may be readily inserted within and removed from the chamber through the open upper end thereof.

The valve core 11 above described is rotatable with respect to the valve body so as to bring its passage 12 into and out of axial alinement with the passages 6 and 7 of the valve body, and said core is also capable of tilting or rocking about its vertical axis so as to cause one of the tapered valve faces 13 to move into and out of tight sealing contact with the valve seat 8 at the inner end of the outlet passage 6 of the valve body. My present invention relates primarily to the mechanism for effecting the aforesaid rotary and tilting movements of the valve core as the valve is moved to open or closed position.

The upper section 2 of the valve body is provided with a centrally-located chamber or recess 16, circular in cross-section and of substantial length. A valve stem 17 extends upwardly through an aperture in the wall defining the top of the chamber or recess 16, the upper end of this stem being squared or otherwise formed to cooperate with a valve actuating wheel or handle 18. The joint between the rotary valve stem 17 and the valve body is rendered fluid tight by means of a packing 19 compressed within a packing socket by a follower 20 operated by clamping bolts 21, all as clearly shown in the accompanying drawings. That portion of the valve stem 17 which is disposed within the chamber or recess 16, is provided with an enlarged cylindrical portion 22 intermediate the ends of the stem, the lower end 23 of the stem being threaded. The enlarged portion 22 of the valve stem is provided with an axially extending groove 24 which terminates intermediate the ends of the said enlarged portion, this groove being arcuate in transverse cross section. A radially-extending pin or projection 25 extends from the groove 24 for a purpose to be hereinafter described.

A combined rotatable and axially movable actuating member 26, best illustrated in Figure 11 of the accompanying drawings, has an upper recess 27 adapted to receive therein the enlarged cylindrical portion 22 of the valve stem. The bottom of this actuating member 26 is provided with a transverse slot 28 which extends completely across the bottom of the said member and which has parallel, inclined side walls, the width of this slot being slightly greater than the width of the substantially T-shaped extension 15 on the valve core 11, which extension is disposed within the said slot, whereby rotation of the actuating member 26 will cause rotation of the valve core about its trunnion 14, and axial movement of said member with respect to the valve core, due to the engagement between the inclined side walls of the slot 28 and the extension 15, will cause the said valve core 11 to tilt or rock about its trunnion 14. The said actuating member 26 is provided with a screw-threaded bore which engages the threads 23 on the lower end of the valve stem 17, whereby rotation of said stem with respect to the actuating member, will cause the said member to move axially of the stem. The upper end of the member 26 is cut away to form a substantially semi-circular groove 29. The upper edge of the member 26 is provided with a lug or projection 30 which cooperates with the pin or projection 25 carried by the enlarged portion 22 of the valve stem, and the wall of the actuating member 26, directly beneath the lug or projection 30, is provided with a radially-extending slot 31.

Rigidly secured within the chamber or recess 16 in the upper section of the valve body, is a cylindrical sleeve 32, the detailed construction of which is best illustrated in Figure 10 of the accompanying drawings, this sleeve having an arcuate projection 33 extending inwardly from the inner wall thereof and of a length approximately one-fourth of the inner circumference of the said sleeve. This sleeve 32 surrounds the actuating member 26 with the arcuate projection 33 residing in the arcuate groove 29 when the said actuating member is disposed within the upper part of the chamber or recess 16, the engagement between the ends of the groove 29 and the ends of the said arcuate projection 33, limiting the relative rotation of the actuating member 26 with respect to the valve body. The inner surface of the sleeve 32 is provided with an axially extending groove 34 arcuate in transverse cross section, and corresponding substantially in shape and size to the axially extending groove 24 in the enlarged portion 22 of the valve stem.

As a means for operatively connecting and disconnecting the valve stem to and from the actuating member 26 to effect alternate rotary and axial movements of said actuating member, by said valve stem, a clutching and declutching member 35 is provided, this member being in the form of a disk-like wafer or washer positioned within the opening 31 in the actuating member 26, in which opening it is free to slide radially so as to enter or recede from the vertically extending grooves 34 and 24 in the sleeve 32 and enlarged portion 22 of the valve stem. When the said member 35 extends into the groove 24, the enlarged portion 22 of the valve stem is clutched to the actuating member 26, whereby rotation of the valve stem will be transmitted to the said actuating member, and when the said member 35 extends into the groove 34, the actuating member 26 is clutched to the stationary sleeve 32 and, hence, the valve stem can be rotated without rotating the actuating member, it being noted, however, that the threaded engagement between the valve stem and the actuating member 26 can function to move said actuating member axially of the stem, the member 35 sliding up and down within the groove 34 during such axial movement.

To assemble the valve and operating mechanism within the valve body, the core 11 is turned to a position such that the passage 12 therethrough extends in alinement with the outlet and inlet passages 6 and 7. In this position the core may be readily introduced into the chamber 5 of the valve body and will occupy a position corresponding to the showing of Figure 12 of the accompanying drawings, with the trunnion 14 resting within the bushing 10. The actuating member 26 is then screwed on to the threads 23 at the lower end of the valve stem 17; the clutching or declutching disk 35 inserted within the opening 31 in the actuating member 26; and the mechanism, thus assembled, is inserted within the open end of the chamber or recess 16 in the upper section 2 of the valve body, the sleeve 32 having been previously inserted within the said chamber or recess and rigidly secured therein by any suitable means. Packing 19 is inserted within the packing socket at the upper end of the section 2 of the valve body and is forced into fluid tight engagement with the valve stem 17 by means of the follower 20 actuated by the clamping bolts 21. The upper section 2 is then applied to the lower section 3 with the extension 15 entering within the slot 28 on the bottom wall of the actuating member 26, whereupon the clamping nuts are applied to the studs carried by the lower section 3 which extend through apertures in the marginal flange of the upper section 2 and are tightened to complete the assembly of the valve. The hand wheel or handle 18 is then attached to the squared upper end of the valve stem 17, whereupon the valve is ready for use, the various component parts above described being positioned as clearly shown in Figure 1 of the accompanying drawings, wherein the valve is shown in open position.

Referring now to the operation of the valve construction above described, and assuming that the valve is in open position as shown in Figure 1, rotation of the hand wheel 18 in a clockwise direction will cause a corresponding rotation of the valve stem 17 and the enlarged portion 22 thereof. As, at this time, the clutching and declutching member 35 is disposed within the groove 24 and is retained therein by contact with the smooth inner surface of the sleeve 32, the valve stem and the actuating member 26 are constrained to simultaneous rotation, which rotation continues through approximately 90 degrees, the engagement between the walls of the slot 28 and the upper end of the substantially T-shaped extension 15 on the valve core, causing the said core to rotate about its trunnion 14 to position the passage 12 of the said core transverse of the passages 6 and 7 and to dispose the valve faces 13 adjacent the inner ends of said passages. When the clockwise rotation of the hand wheel 18 and its associated stem 17, has progressed through approximately 90 degrees, i. e., to a point where the end wall of the groove 29 abuts against the end of the stationary lug or projection 33, the clutching and declutching member 35 is disposed opposite the vertical groove 34 on the inner surface of the sleeve 32, so that the continued clockwise rotation of the valve handle and stem causes the member 35 to move outwardly into the groove 34, thus declutching the actuating member from the enlarged portion 22 of the valve stem 17 and clutching said actuating member to the stationary sleeve 32, whereupon the continued clockwise rotation of the valve stem will no longer be transmitted to the actuating member, but such continued rotation, due to the threaded connection between the valve stem and actuating member, will cause axial movement of said actuating member 26 toward the valve core 11. As the actuating member 26 moves toward the valve core, the inclined walls defining the slot 28 engage the edges of the T-shaped extension 15, which results in the movement of the upper end of the valve core 11 outwardly in a radial direction with respect to the axis of the valve chamber 5 and the valve stem 17, thereby causing the valve core to tilt on its trunnion 14 so as to effect an angular displacement of the axis of the core. This tilting movement forces the valve face 13 into firm contact with the cooperating valve seat 8, whereupon the valve is fully closed and the component parts assume the positions shown in Figure 9.

It is to be particularly noted that during the initial quarter turn of the valve hand wheel, i. e., when the stem and its associated parts are moving from the positions shown in Figures 1 to 4 inclusive to the positions shown in Figures 5 to 7 inclusive, the member 35 is retained in clutching engagement within the groove 24 in the enlarged portion 22 of the valve stem by engagement with the inner surface of the sleeve 32, and this clutching continues until rotation of the actuating member is arrested by contact between the end wall of the groove 29 and the stationary stop lug or projection 33. The parts then assume positions corresponding to those shown in Figures 5 to 7, wherein the member 35 is disposed opposite the vertical groove 34 in the sleeve 32. Continued rotation of the valve stem will, as illustrated in Figure 8, cause the member 35 to move radially of the slot 31 and into the groove 34 to clutch the actuating member to the stationary sleeve 32. When the threaded engagement between the valve stem and actuating member 26 causes an axial movement of the actuating member, the solid, ungrooved portion of the enlargement 22 maintains the member 35 within the groove 34 and, as the said actuating member is moved downwardly along the stem, the said stem is free to rotate and there is no engagement between the actuating member and the stop lug or projection 33 on the stationary sleeve 32. While there is no cooperation whatever between the radially extending pin 25 and the upstanding lug 30 on the actuating member during the actuation of the valve from open to closed position, it is to be noted that as soon as the actuating member is clutched to the stationary sleeve 32, the said actuating member moves downwardly and, hence the pin 25 is free to rotate with the valve stem without contacting with the lug 30 which now occupies a plane below the plane of rotation of the pin or projection 25.

When it is desired to open the valve to permit the flow of fluid therethrough, i. e., when it is desired to move the valve from the closed position shown in Figure 9 to the open position shown in Figure 1, a counter-clockwise rotation of the hand wheel 18 effects a corresponding rotation of the valve stem 17 and the enlarged portion 22 thereof. As, at this time, the clutching and declutching member 35 is disposed within the groove 34 and is retained therein by contact with the smooth cylindrical surface of the enlarged portion 22, the actuating member 26 is positively held in non-rotating position, and, hence, the screw-threaded engagement between the lower end of the valve stem 17 and the actuating member 26 will cause the said actuating member to travel upwardly along the stem. During this upward movement of the actuating member 26, the engagement between the inclined walls of the slot 28 and the upper end of the substantially T-shaped extension 15 of the valve core 11 will cause the upper end of the said core to move inwardly in a radial direction with respect to the axis of the valve chamber 5 and the valve stem 17, thereby causing the valve core to tilt on its trunnion 14 so as to effect an angular displacement of the axis of the core. This tilting movement forces the valve face 13 away from its cooperating valve seat 8, it being noted that during the upward movement of the actuating member 26 along the threaded portion of the valve stem, the valve core 11 is held against upward displacement by the engagement of the lower end of the valve stem 17 with the upper surface of the T-shaped extension 15 on the valve core.

During the initial upward movement of the actuating member, the radially-extending pin 25 carried by the valve stem portion 22 rotates freely within the upper portion of the chamber 16, but just as soon as the continued rotation of the valve stem 17 effects the upward movement of the actuating member 26 to a position where the upstanding lug or projection 30 enters the plane of rotation of the pin or projection 25, the pin 25 will engage the lug 30 and this engagement will prevent further relative rotary movement between the actuating member 26 and the enlarged portion 22 of the valve stem. The engagement between the pin or projection 25 and lug or projection 30 will cause the actuating member to be held in a position such that the clutching and declutching member 35 will be disposed opposite the groove 24 in the enlarged portion 22 of the stem, it being noted that in this position, due to the upward travel of the actuating member 26 along the stem 17, the said member 35 has been moved to a position above the smooth cylindrical surface of the enlarged portion 22 of the stem so that it is free to be moved into the groove 24, i. e., the component parts of the mechanism have now reached the positions best shown in Figures 5, 6 and 7 of the accompanying drawings, it being further noted that the stationary projection 33 carried on the inner surface of the stationary sleeve 32 is now disposed within, and is in contact with one end wall of, the arcuate slot 29 of the actuating member 26 as best shown in Figure 6, the arrangement being such that the actuating member 26 may partake of a quarter turn, counter-clockwise movement before the engagement between the opposite end of the stationary projection 33 and the opposite end wall of the groove 29 arrests such counter-clockwise rotation of the said actuating member 26. As the counter-clockwise rotation of the hand wheel is continued, the engagement between the clutching and declutching member 35 and the smooth inner surface of the sleeve 32 will retain the member 35 within the groove 24 and, hence, the actuating member 26 and valve stem 17 will be constrained to simultaneous rotation, which rotation will continue for a quarter turn, i. e., until the component parts have moved from their positions shown in Figure 6 to their positions shown in Figure 4. During the said quarter turn, the engagement between the side walls of the slot 28 and the substantially T-shaped extension 15 on the valve core, will rotate the said valve core through 90 degrees to its open position shown in Figure 1, whereupon the fluid is free to flow through the valve.

It will thus be seen that during the operation of the valve from closed to open position, the radially projecting pin 25 and the upstanding lug 30 function only during substantially the last quarter turn of the valve operating mechanism; that the engagement between the clutching and declutching member 35 and the groove 34 initially clutches the actuating member 26 to the stationary sleeve 32 to prevent rotation of the actuating member while permitting axial movement thereof; that the engagement between the projecting pin 25 and the upstanding lug 30 holds the actuating member in a position where the member 35 is free to enter the groove 24 to declutch the actuating member from the stationary sleeve 32 and to clutch said actuating member to the valve stem for rotation therewith; and that the engagement between the end wall of the arcuate groove 29 and the stationary lug or projection 33 limits the rotation of the actuating member 26 to the quarter turn necessary to position the passage 12 through the valve core 11 into alignment with the outlet and inlet passages 6 and 7 through the valve body. While in the accompanying drawings and in the above description, I have illustrated and described a separate sleeve 32, it will be obvious to one skilled in the art that such sleeve may be omitted and the vertical groove 34 and the arcuate stop lug or projection 33 formed on the inner wall of the chamber or recess 16 in the upper section 2 of the valve casing or body.

In Figures 13 to 20 inclusive of the accompanying drawings, I have illustrated a modified form of my invention which embodies numerous features and advantages of the construction shown and described in connection with the preceding figures. In this embodiment of my invention, the numeral 36 designates broadly the valve body, comprising an upper section 37 and a lower section 38, which sections are detachably secured together by a series of clamping bolts 39. The lower section 38 of the valve body is provided with a valve chamber 40, communicating with which are passages 41 and 42 for the outflow and inflow of the fluid to be controlled by the valve. These passages, like the passages 6 and 7 of the preferred construction previously described herein, are disposed in axial alinement and either terminate in marginal end flanges 43 and 44 which may be bolted or otherwise attached to a well casing, pipe or the like, and/or are interiorly threaded to permit such attachment. The outlet passage 41 is preferably provided with a removable and replaceable machined valve seat 45 rigidly secured within the inner end of said passage. The wall defining the bottom of the chamber 40 is centrally apertured to receive therein a removable bushing 46 with which it has threaded connection.

The chamber 40 within the lower section 38, is open at its top to permit the introduction of a valve core 47, which core is formed with a passage 48 cylindrical throughout its length and of a diameter corresponding to that of the passages 41 and 42 of the valve body so as to afford a straight, uninterrupted passage for fluid when the valve is in open position. One of the side faces of the valve core is provided with a threaded, centrally-located recess or aperture adapted to receive therein the threaded stud 49 of a removable valve face 50 of sufficient extent to border the margins of the passages 41 and machined to cooperate with the valve seat 45 to effect a fluid tight seal or closure when moved into contact with said seat. The lower surface of the valve core 46 is provided with a centrally-located, cylindrical trunnion 51, the extremity of which is curved or rounded, this trunnion being received within the removable bushing 46 when the said bushing is secured within the opening in the bottom wall of the chamber 40, and permitting rotary as well as tilting movement of the valve core 47 within the valve chamber 40. The upper surface of the valve core 47 is provided with an elongated, flattened extension 52 substantially T-shaped in vertical cross section, this flattened extension being disposed in parallel relation to the axis of the passage 48 through the valve core 47.

The valve core 47 above described is rotatable with respect to the valve body, so as to bring its passage 48 into and out of alinement with the passages 41 and 42 of the valve body, and said core is also capable of tilting or rocking about its vertical axis so as to cause the valve face 50 to move into and out of tight sealing contact with the valve seat 45 at the inner end of the outlet passage 41 of the valve body.

To effect the alternate rotary and tilting movements of the valve core as the valve is moved to open or closed position, I associate with the valve core 47 an operating stem 53 provided with an enlarged portion 55 at its lower end, adapted for mounting in a chamber or recess 54 formed within the upper section 37 of the valve body, within which chamber the enlarged portion 55 can partake of rotary and sliding movements. The stem 53 is extended upwardly through an aperture in the wall defining the top of the chamber or recess 54. The joint between the valve stem and the valve body is rendered fluid-tight by means of a packing 56 compressed within a packing socket by a follower 57, operated by clamping bolts 58, all as clearly shown in Figure 13. The lower face of the enlarged portion 55 of the valve stem is provided with a transverse slot 59 which extends completely across the bottom of the said member and which has parallel, inclined side walls, the width of this slot being slightly greater than the width of the substantially T-shaped extension 52 on the valve core 47, which extension is disposed within the said slot, whereby rotation of the valve stem 53 will cause rotation of the valve core 47 about its trunnion 51, and axial movement of said valve stem with respect to the valve core, due to the engagement between the inclined side walls of the slot 59 and the extension 52, will cause the said valve core 47 to tilt or rock about its trunnion 51.

The upper end of the valve stem 53 is externally screw-threaded as at 60, these threads engaging cooperating threads on the inner surface of a sleeve 61 constituting the hub of a valve wheel or handle 62. The said hub 61 is provided with an annular flange 63, with a radially extending lug or projection 64, and with an axially-extending groove or recess 65 which is arcuate in transverse cross-section, the purposes and functions of the said flange, lug and groove to be hereinafter described.

Surrounding the sleeve 61 below the annular flange 63 thereon, is a cup-shaped member 66, which is keyed or otherwise secured, as at 67, to the valve stem 53, whereby said member 66 and the stem 53 are constrained to simultaneous rotary and axial movements. The member 66 is provided with an upstanding lug or projection 68, engageable with the lug or projection 64 carried on the sleeve 61. The said member 66 is also provided with a radially-extending opening 69 of a width and length approximately that of the axially extending groove or recess 65. A clutching and declutching member 70 is provided, this member comprising a relatively short cylinder or a plurality of disk-like wafers or washers forming a composite cylinder when arranged in superimposed relation, the length of this cylinder 70 being approximately the same as the lengths of the groove or recess 65 in the member 61 and the opening 69 in the member 66. This clutching and declutching member 70 is free to slide radially in the opening 69 in the member 66 and into and out of engagement with the recess 65 in the member 61, and serves, when in engagement with the said recess 65, to clutch the members 61 and 66 together for simultaneous rotation.

Surrounding the upper threaded end of the valve stem 53, the cooperating cup-shaped member 66 and hub portion 61, is a vertically split, two-part casing 71, comprising two substantially similar sections 72 and 73, each provided with apertured lugs or projections 74 and 75, through which are passed the clamping bolts 76, by means of which the two sections may be rigidly clamped together. The inner surface of each of the sections 72 and 73 is provided with a semi-circular groove adapted to receive the annular flange 63 on the hub portion 61, this engagement between the grooves and flange permitting the hub 61 to rotate within the casing 71 but preventing said hub from moving axially with respect to said casing. The inner surface of the section 73 is provided with a vertical groove 77, arcuate in transverse cross section, and terminating intermediate the ends of a chamber 78 within the casing 71, it being noted that this chamber 78 is of appreciably greater length than the overall length of the cup-shaped member 66. The casing sections 72 and 73 which constitute the casing 71, are each supported from the valve body by standards 79 and 80, formed integral with the respective sections and terminating at their lower ends in apertured flanges adapted to be secured to the valve body at diametrically opposite positions by means of the clamping bolts 39.

Keyed on the valve stem 53 between the upper surface of the follower 57 and the bottom wall of the casing 71, is a stop disk 81, having a radially-projecting portion 82 which, upon partial rotation of the valve stem, contacts with either the standard 79 or the standard 80, depending upon the direction of rotation of the valve stem, to limit the rotation of said stem with respect to the valve body.

To assemble this valve and its operating mechanism within the valve body, the core 47 is turned to a position such that the passage 48 therethrough extends transversely with respect to the axis of the passages 41 and 42. In this position the core, without the valve face 50, may be readily introduced into the valve chamber 40 of the valve body, as clearly shown in Figure 14. The valve face 50 is then secured to the valve core 47 by screwing the stud 49 into the threaded aperture in the valve core, and the bushing 46 is then screwed into the opening in the bottom wall of the valve chamber to surround the trunnion 51, it being noted that the engagement between the curved or rounded end of the trunnion and the curved or rounded socket in the bushing, will permit not only rotary movement but also tilting movement of the valve core 47 within the valve chamber 40. The valve stem 53 is passed upwardly through the opening in the wall defining the top of the chamber 54; the packing 56 is inserted within the packing socket at the upper end of the section 37 of the valve body and is forced into fluid tight engagement with the valve stem 53 by means of the follower 57 actuated by clamping bolts 58; the stop disk 81 is keyed or otherwise rigidly secured to the valve stem 53; the cup shaped member 66 is keyed or otherwise rigidly secured to the valve stem 53; the hub 61 is screwed onto the upper threaded end of the valve stem until its lower edge contacts with the bottom of the cup-shaped member 66, at which time the stop lug 64 carried by the hub 61 contacts with the lug 68 carried by the cup-shaped member 66, which contact alines the opening 69 in said cup-shaped member with the recess 65 in the hub 61; the clutching and declutching device 70 is inserted into the alined opening 69 and recess 65; the two casing sections 72 and 73 are brought into engagement with the cup-shaped member 66 and hub portion 61, with the annular flange 63 occupying the grooves in the inner surfaces of said sections; and the clamping bolts 76 are then passed through the lugs 74 and 75 and the two casing sections 72 and 73 rigidly clamped together. The upper section 37 is then applied to the lower section 38 with the extension 52 of the valve core entering within the slot 59 on the bottom wall of the enlarged portion 55 of the valve stem, whereupon the clamping bolts 39 are inserted and the two sections of the valve body rigidly secured together, certain of the clamping bolts 39 being passed through the apertures in the lower ends of the standards 79 and 80, to rigidly secure the standards and the casing 71 carried thereby, to the valve body. The valve is now ready for use, the various component parts above described being positioned as clearly shown in Figure 13, wherein the valve is shown in open position.

Referring now to the operation of the valve construction shown in Figures 13 to 20 inclusive, and assuming that the valve is in open position as shown in Figure 13, rotation of the hand wheel 62 in a clockwise direction, will cause a corresponding rotation of the hub 61. As, at this time, the clutching and declutching member 70 is disposed within the groove 65 and is retained therein by contact with the smooth inner surface of the section 73, the hub 61, the cup-shaped member 66 and the valve stem 53 will rotate in unison for approximately a quarter turn, i. e., until the radially projecting stop portion 82 of the disk 81 secured to the valve stem strikes the standard 79, whereupon the rotation of the valve stem will be arrested, the engagement between the wall of the slot 59 and the upper end of the substantially T-shaped extension 52 on the valve core, causing the said core to rotate about its trunnion 51 to position the passage 48 of said core transverse of the passages 41 and 42 and to dispose the valve face 50 adjacent the inner end of the passage 41. During this initial quarter turn of the operating wheel 62, the component parts of the mechanism within the casing 71 have been moved from the positions shown in Figure 16 to the positions shown in Figures 14 and 17, i. e., to a position where the clutching and declutching member 70 stands opposite the vertical groove 77 on the inner face of the casing section 73, so that continued clockwise rotation of the valve handle causes the member 70 to move outwardly into the groove 77, thus declutching the hub or sleeve 61 from the cup-shaped member 66 and clutching the said cup-shaped member to the stationary casing section 73, whereupon the continued clockwise rotation of the hub or sleeve 61 will no longer be transmitted to the cup-shaped member 66, but such continued rotation, due to the threaded connection between the valve stem 53 and the member 66, will cause axial movement of the member 66 and the valve stem 53 carried thereby, toward the valve core 47. As the member 66 and the valve stem 53 move toward the valve core 47, the inclined walls defining the slot 59 engage the edges of the T-shaped extension 52, which results in the movement of the upper end of the valve core 47 outwardly in a radial direction with respect to the axis of the valve chamber 40 and the valve stem 53, thereby causing the valve core to tilt on its trunnion 51 so as to effect an angular displacement of the axis of the core. This tilting movement forces the valve face 50 into firm contact with the cooperating valve seat 45, whereupon the valve is fully closed and the component parts assume the positions shown in Figure 15.

Figure 16:
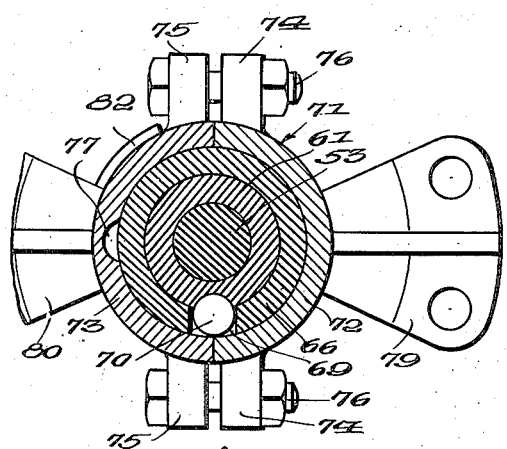
Figure 17:
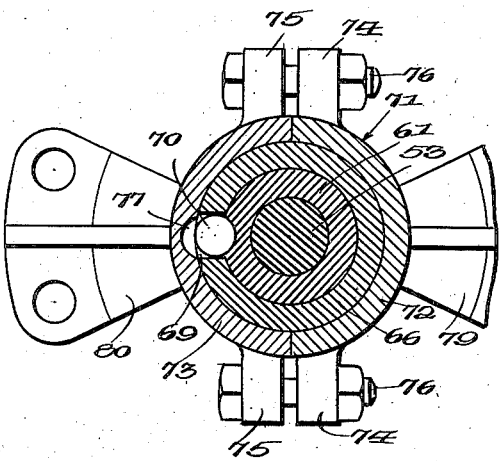
Figure 19:
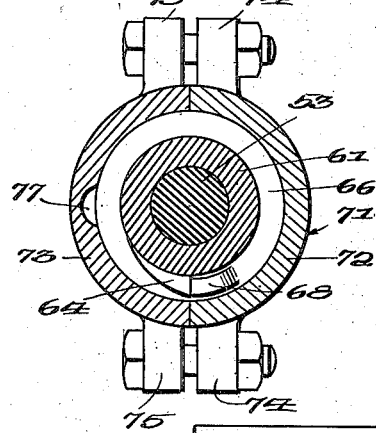
Figure 18:
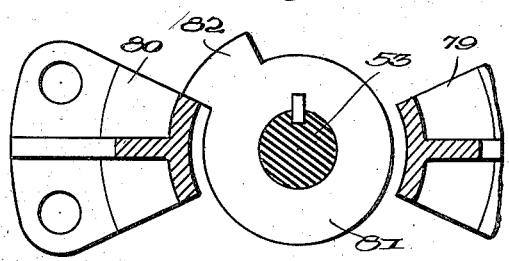

It is to be particularly noted that during the initial quarter turn of the hand wheel 62, i. e., when the stem and its associated parts are moving from the positions shown in Figures 13 and 16 to the positions shown in Figures 14 and 17, the member 70 is retained in clutching engagement within the recess 65 in the hub or sleeve portion 61 by engagement with the smooth inner surface of the casing section 73, and this clutching continues until rotation of the cup-shaped member 66 is arrested by contact between the stop projection 82 and the standard 79. The parts then assume positions corresponding to those shown in Figures 14 and 17, wherein the member 70 is disposed opposite the vertical groove 77. Continued rotation of the hub or sleeve 61 will cause the member 70 to move radially of the slot 69 and into the groove 77 to clutch the cup-shaped member 66 to the stationary casing section 73. When the threaded engagement between the valve stem 53 and the cup-shaped member 66 causes the axial movement of the said cup-shaped member and stem, the solid, ungrooved portion of the hub 61 maintains the member 70 within the groove 77 and, as the stem 53 moves downwardly toward the valve core, there is no engagement between the radially-extending lug or projection 64 and the upwardly-extending lug or projection 68, in fact, there is no cooperation whatever between these members during the actuation of the valve from open to closed position.

When it is desired to open the valve to permit the flow of fluid therethrough, i. e., when it is desired to move the valve from the closed position shown in Figure 15 to the open position shown in Figure 13, a counter-clockwise rotation of the hand wheel 62 effects a corresponding rotation of the hub 61. As, at this time, the clutching and declutching member 70 is disposed within the groove 77 and is retained therein by contact with the smooth inner cylindrical surface of the hub 61, the cup-shaped member 66 and the valve stem 53 are positively held in non-rotating position, and, hence, the screw-threaded engagement between the valve stem and the hub portion 61 will cause the cup-shaped member 66 and the valve stem 53 to travel upwardly with respect to the valve core. During this upward movement of the stem, the engagement between the inclined walls of the slot 59 and the upper end of the substantially T-shaped extension 52 will cause the upper end of the valve core to move inwardly in a radial direction with respect to the axis of the valve chamber 40 and the valve stem 53, thereby causing the valve core to tilt on its trunnion 51 so as to effect an angular displacement of the axis of the core. This tilting movement forces the valve face 50 away from its cooperating valve seat 45, it being noted that during the upward movement of the stem, the valve core 47 is held against upward displacement by the engagement of the lower end of the casing walls which define the chamber or recess 54. During the initial upward movement of the stem 53 and cup-shaped member 66, the lug or projection 64 rotates freely within the upper part of the chamber 78, but just as soon as the continued rotation of the hub effects the upward movement of the cup-shaped member 66 to a position where the upstanding lug or projection 68 enters the plane of rotation of the lug or projection 64, the lug 64 will engage the lug or projection 68 and this engagement will, upon continued counter-clockwise rotation of the hub 61, cause the cup-shaped member 66 to be held so as to position the clutching and declutching member 70 opposite the groove 65 in the hub or sleeve 61, i. e., the component parts of the mechanism above described have now reached the positions best shown in Figures 14 and 17 of the accompanying drawings. As the counter-clockwise rotation of the hub or sleeve 61 is continued, the engagement between the clutching and declutching member 70 and the smooth inner surface of the casing section 73 will retain the member 70 within the groove 65 and, hence, the hub 61 and the valve stem 53 will be constrained to simultaneous rotation, which rotation will be approximately a quarter turn, i. e., until the stop lug 82 of the disk 81 contacts with the standard 80. During the said quarter turn, the engagement between the side walls of the slot 59 and the extension 52, will rotate the said valve core through 90 degrees to its open position shown in Figure 13, whereupon the fluid is free to flow through the valve.

It will thus be seen that during the operation of the valve from closed to open position the lugs or projections 64 and 68 function only during substantially the last quarter turn of the valve operating mechanism; that the engagement between the clutching and declutching member 70 and the groove 77 initially clutches the cup-shaped member 66 to the stationary casing section 73 to prevent rotation of said cup-shaped member while permitting axial movement thereof; that the engagement between the lugs or projections 64 and 68 holds the cup-shaped member in a position where the member 70 is free to enter the groove 65 to declutch the cup-shaped member 66 from the stationary casing section 73 and to clutch said cup-shaped member to the hub 61 for rotation therewith; and that the engagement between the stop lug or projection 82 and the standard 80 limits the rotation of the cup-shaped member 66 and the valve stem 53 to the quarter turn necessary to position the passage 48 into alinement with the outlet and inlet passages 41 and 42.

In both of the forms of my improved valve disclosed herein, it is to be noted that the entire cycle of operations is definite and positive and that such operations are so timed that they occur at fixed positions. This permits the opening and closing operations to be reversed at any stage without interfering with the effective functioning of the various parts. A further advantage of my present invention resides in the fact that the operating mechanism is at no time subjected to the thrust created on the valve core by the high pressure fluid being controlled, as such thrust is transmitted through the extension on the valve core through the slotted operating member and direct to the valve casing or body.

It is to be understood that the forms of my invention shown and described herein are to be taken as preferred embodiments of my invention and that various changes may be made in the size, shape and arrangement of parts, without departing from the spirit of my invention or the scope of the subjoined claims.

I claim:

1. A valve comprising a valve body having an inlet and an outlet opening and a valve chamber communicating with said openings; a valve core journalled within said chamber for rotary and bodily tilting movements therein; a combined rotatable and axially movable member engaging said valve core; and single motion means for rotating said member and moving the same axially to effect rotation and tilting of said valve core bodily within said valve chamber.

2. The combination of a valve body having a passage therethrough, a rotary valve core within the body and having an opening therethrough, said valve core being journalled for rotary and bodily tilting movements within said body, a combined rotatable and axially movable member engaging said valve core, means for rotating said movable member to cause the opening in the valve core to aline with said passage or to move out of register with said passage, said means by continued rotation causing said movable member to move axially to tilt said core bodily to cause it to seal one of said openings.

3. A valve comprising a valve body having an inlet and an outlet opening and a valve chamber communicating with said openings; a valve core journaled within said chamber for rotary and tilting movements therein, said valve core having an extension projecting from the surface thereof; a combined rotatable and axially movable member engaging the extension on said valve core; and rotating means for rotating said member and moving the same axially to effect alternate rotation and tilting of said valve core within said valve chamber.

4. A valve comprising a valve body having an inlet and an outlet opening and a valve chamber communicating with said openings; a valve core journalled within said chamber for rotary and tilting movements therein, said valve core having an extension projecting from the surface thereof; a combined rotatable and axially movable member provided with a slot to engage the extension on said valve core, said slot having inclined side walls; and means for rotating said member and moving the same axially, rotation of said member effecting a corresponding rotation of said valve core within said valve chamber and axial movement of said member, due to the engagement between the extension and the inclined side walls of said slot, effecting tilting of said valve core within said valve chamber.

5. A valve comprising a valve body having an inlet and an outlet opening and a valve chamber communicating with said openings; a valve core journalled within said chamber for rotary and tilting movements therein; and means for rotating and tilting said valve core within said valve chamber, said means including a rotary member, a sleeve surrounding said member and slidably connected to said valve core, means for clutching said member and sleeve together for simultaneous rotation to rotate the valve core and for declutching said member from said sleeve to permit independent movements of said member and said sleeve, and means for moving the sleeve axially to tilt said valve core within the valve chamber when the rotary member and sleeve are declutched.

6. A valve comprising a valve body having an inlet and an outlet opening and a valve chamber communicating with said openings; a valve core journalled within said chamber for rotary and tilting movements therein; and means for rotating and tilting said valve core within said valve chamber, said means including a rotary member, a sleeve surrounding said member and slidably connected to said valve core, means for clutching said member and sleeve together for simultaneous rotation to rotate the valve core and for declutching said member from said sleeve to permit independent movements of said member and said sleeve, means for moving the sleeve axially to tilt said valve core within the valve chamber when the rotary member and sleeve are declutched; and stop means for limiting the rotary movement of said sleeve and the valve core operated thereby.

7. A valve comprising a valve body having an inlet and an outlet opening and a valve chamber communicating with said openings; a valve core journalled within said chamber for rotary and tilting movements therein; a valve stem rotatable with respect to said valve core and valve body and having a threaded portion; a combined rotatable and axially movable member surrounding said valve stem and engaging said valve core, said member having threaded engagement with said valve stem and having an arcuate groove at the upper edge thereof; an inwardly extending lug carried by the valve body and disposed within the arcuate slot in the movable member, said lug being of lesser extent than the groove to permit rotation of said member with respect to the valve body to an extent determined by contact between the ends of said groove and the ends of said lug; and means for clutching said movable member to said valve stem for initial rotation therewith, the extent of such initial rotation being limited by the engagement between an end wall of the groove and an end wall of the lug, which engagement permits the declutching of the movable member from the valve stem and permits the threaded engagement between the movable member and valve stem to move the member axially to tilt the valve core within the valve body.

8. A valve comprising a valve body having an inlet and an outlet opening and a valve chamber communicating with said openings; a valve core journalled within said chamber for rotary and tilting movements therein; a valve stem rotatable with respect to said core and valve body and having a threaded portion; a combined rotatable and axially movable member surrounding said valve stem and engaging said valve core, said member having threaded engagement with said valve stem and having an upstanding lug at the upper edge thereof; a clutching and declutching mechanism actuated by rotation of said valve stem for alternately declutching said member from said valve stem to permit rotation of said stem to move the member axially to tilt said valve core within said valve chamber and subsequently clutching said member to the valve stem to permit simultaneous rotation of said member by said valve stem; and a lug carried by the valve stem and engaging the upstanding lug on the movable member when said member has completed its axial movement, to hold said member in a position to be clutched to said valve stem for rotation therewith to rotate the valve core within the valve chamber.

9. A valve comprising a valve body having an inlet and an outlet opening and a valve chamber communicating with said openings; a valve core journalled within said chamber for rotary and tilting movements therein; and means for rotating and tilting said valve core within said valve chamber, said means including a rotary valve stem, the lower end of which engages said valve core and the upper end of which is screw-threaded; a rotary valve-operating handle having an internally-threaded hub portion engaging the threads on the valve stem, said hub portion having a radially projecting lug; a sleeve surrounding said hub portion and rigidly connected at its lower end to said valve stem, said sleeve having an upstanding lug at the upper edge thereof; a clutching and declutching mechanism actuated by rotation of said hub portion for alternately declutching said sleeve from said hub portion to permit the threaded engagement between the hub portion and valve stem to move the valve stem axially to tilt the valve core within the valve chamber and subsequently clutching said sleeve to the hub to permit simultaneous rotation of said sleeve by said hub, the axial movement of said valve stem and the sleeve connected thereto bringing the radially projecting lug on the hub portion into contact with the upstanding lug on the sleeve when the sleeve and valve stem have completed their upward axial movement, continued rotation of said hub portion with the aforesaid lugs in engagement, holding the said sleeve in a position to be clutched to said hub portion for rotation therewith to rotate the valve stem and the valve core engaged therewith; and stop means carried by the valve stem and engaging a part of the valve body to limit the rotary movement of said valve stem and the valve core operated thereby.

10. A valve comprising a valve body including a lower section having an open top valve chamber and alined inlet and outlet openings communicating with and terminating in spaced relation within said chamber; a valve core journalled within said chamber for rotating and tilting movements therein, said valve core having a passage therethrough for the flow of fluids and having flat imperforate side walls, the width of said valve core between the flat side faces thereof being slightly less than the distance between the ends of the inlet and outlet passages whereby said valve core may be turned so that the flat side walls extend transversely of the axis of the inlet and outlet openings and the core readily inserted within the valve chamber through the open top thereof; a removable valve face adapted for attachment to one of the flat side faces of the valve core after said core has been inserted within the chamber; an upper section connected to the lower section above the open top of said lower section; and means carried by said upper section and engaging the valve core to alternately rotate and tilt said valve core within the valve chamber, the rotary movements of said valve core moving the passage into and out of alinement with the inlet and outlet opening, and the tilting movements of the valve core moving said valve face into and out of contact with the end of one of the openings in the valve chamber.

ALFRED G. HEGGEM.